United States Patent
Richer

(10) Patent No.: US 12,138,976 B1
(45) Date of Patent: Nov. 12, 2024

(54) UTILITY VEHICLE

(71) Applicant: Pascal Joseph Francois Richer, Burlington (CA)

(72) Inventor: Pascal Joseph Francois Richer, Burlington (CA)

( * ) Notice: Subject to any disclaimer, the term of this patent is extended or adjusted under 35 U.S.C. 154(b) by 0 days.

(21) Appl. No.: 18/489,386

(22) Filed: Oct. 18, 2023

(51) Int. Cl.
*B60F 3/00* (2006.01)

(52) U.S. Cl.
CPC .......... *B60F 3/0038* (2013.01); *B60F 3/0007* (2013.01)

(58) Field of Classification Search
CPC ......... B60F 3/0038; B60F 3/0007; B60F 3/00
See application file for complete search history.

(56) References Cited

U.S. PATENT DOCUMENTS

| | | | | |
|---|---|---|---|---|
| 3,237,589 A | * | 3/1966 | De Biasi | B60F 3/0007 440/12.69 |
| 3,595,198 A | * | 7/1971 | Hacker | B60F 3/0038 440/12.63 |
| 3,595,199 A | * | 7/1971 | Faxas | B60F 3/0007 440/12.69 |
| 11,897,480 B1 | * | 2/2024 | Belo | G06Q 10/02 |
| 2004/0112669 A1 | * | 6/2004 | Rondeau | B62J 1/12 180/312 |
| 2018/0170219 A1 | * | 6/2018 | Deschamps | B60N 2/305 |
| 2023/0202610 A1 | * | 6/2023 | Christini | B60K 7/0007 180/68.5 |

* cited by examiner

*Primary Examiner* — Stephen P Avila
(74) *Attorney, Agent, or Firm* — Orin Del Vecchio

(57) ABSTRACT

An offroad vehicle that is operable to be driven across various terrains wherein the offroad vehicle of the invention has an occupant compartment that places individuals disposed therein in axial alignment from the front end to the rear end. The present invention includes a frame and integrated roll-over cage having body panels that define an occupant compartment. The vehicle includes four wheels operably coupled to a power source to be rotatably moved thereby. Adjacent each of the four wheels is a water propulsion member wherein the water propulsion member includes blades configured to apply resistance force to water and move the vehicle therethrough. The frame further includes floatation chambers located at the front end and rear end thereof being operable to float the vehicle in water. The rear seat member is elevated with respect to the front seat member and a joystick style controller is adjacent the front seat member.

9 Claims, 4 Drawing Sheets

UTILITY VEHICLE

FIELD OF THE INVENTION

The present invention relates generally to all-terrain vehicles, more specifically but not by way of limitation, a utility task vehicle configured to carry two passengers in a linear arrangement wherein the vehicle of the present invention is further configured to float and includes water propulsion members to propel the vehicle through water.

BACKGROUND

All Terrain Vehicles (ATV) and Utility Task Vehicles (UTV) have exploded in popularity over the last decade. Whether being utilized for recreational purposes or for work, these vehicles are well equipped to provide the ability to travel across various terrains. The UTV category is a popular alternative to traditional off road motor vehicles such as but not limited off road motorcycles. Existing UTV's provide an ability to carry up to four people along with their gear for outings such as but not limited to camping and hunting. There are also intrinsic safety features of UTV's as compared to other off road vehicles wherein UTV's are equipped with a full roll-cage, seatbelts and other safety equipment that can provide an improved experience for the operator.

While UTV's are popular, there are some drawbacks to the existing design. First, the width of most conventional UTV's is wider than other offroad vehicles which is due to the seating arrangement wherein existing UTV's place occupants in a side-by-side configuration. Furthermore, the width of the UTV has been widened in recent years to add more lateral stability. The problem with the increased width of existing UTV's is the impact on trail access. Many trails are narrow and the width of the UTV inhibits access to the trail for others as the UTV consumes a substantial portion of the width of the trail. Another issue with existing UTV's is their inability to float and traverse through deep water. Many times there are deep holes in trails wherein the holes must be traversed through in order to continue along the trail. It is quite common for existing ATV's and UTV's to become stuck in this holes that are filled with water.

Accordingly, there is a need for a UTV that is provided with a width that is less than that of conventional UTV's and wherein the present invention further is capable of floating in deep water and includes water propulsion members that are operable to propel the UTV of the present invention through the water.

SUMMARY OF THE INVENTION

It is the object of the present invention to provide a utility task vehicle configured to traverse across offroad terrain wherein the present invention includes a frame having a top and roll cage integrally formed therewith.

Another object of the present invention is to provide an offroad vehicle that is operable to traverse across various terrains wherein the occupant compartment of the present invention places the occupants in a linear arrangement.

A further object of the present invention is to provide a utility task vehicle configured to traverse across offroad terrain wherein the rear passenger seating area of the occupant compartment is at a level that is higher than that of the front passenger seating area.

Yet a further object of the present invention is to provide an offroad vehicle that is operable to traverse across various terrains wherein the controller disposed in the occupant compartment configured to provide operation of the present invention is a joystick.

Still another object of the present invention is to provide a utility task vehicle configured to traverse across offroad terrain wherein the wheels of the present invention have water propulsion members adjacent thereto and operably coupled to the axles.

An additional object of the present invention is to provide an offroad vehicle that is operable to traverse across various terrains wherein all four wheels are movable to facilitate turning of the vehicle of the present invention wherein the rear wheels turn approximately twenty percent of the turning amount of the front wheels.

Yet a further object of the present invention is to provide a utility task vehicle configured to traverse across offroad terrain wherein the present invention includes at least two flotation chambers operably coupled to the frame wherein the flotation chambers are configured to float the vehicle of the present invention.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
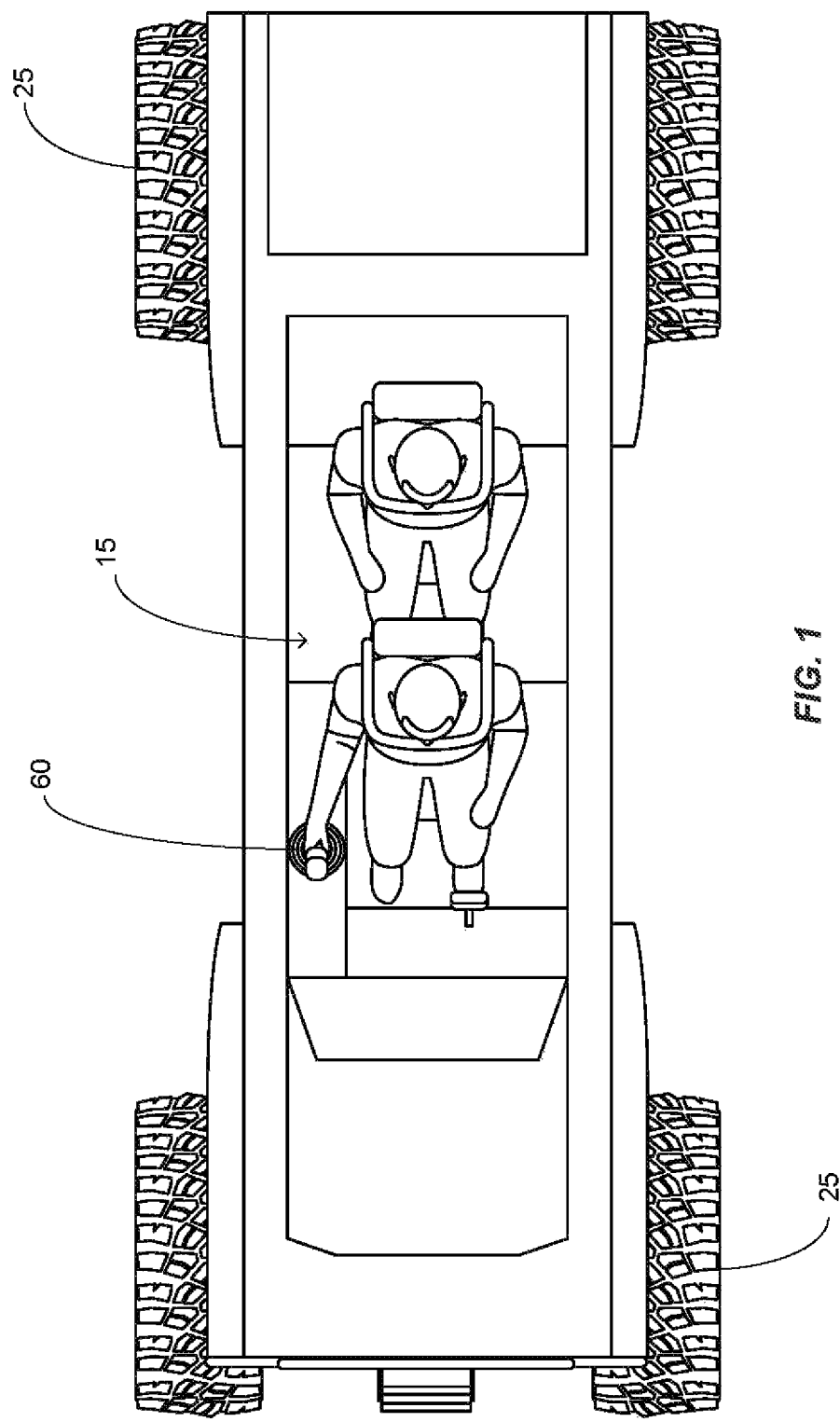
FIG. 1 is a top view of the present invention showing the occupant compartment thereof.
Figure 2:
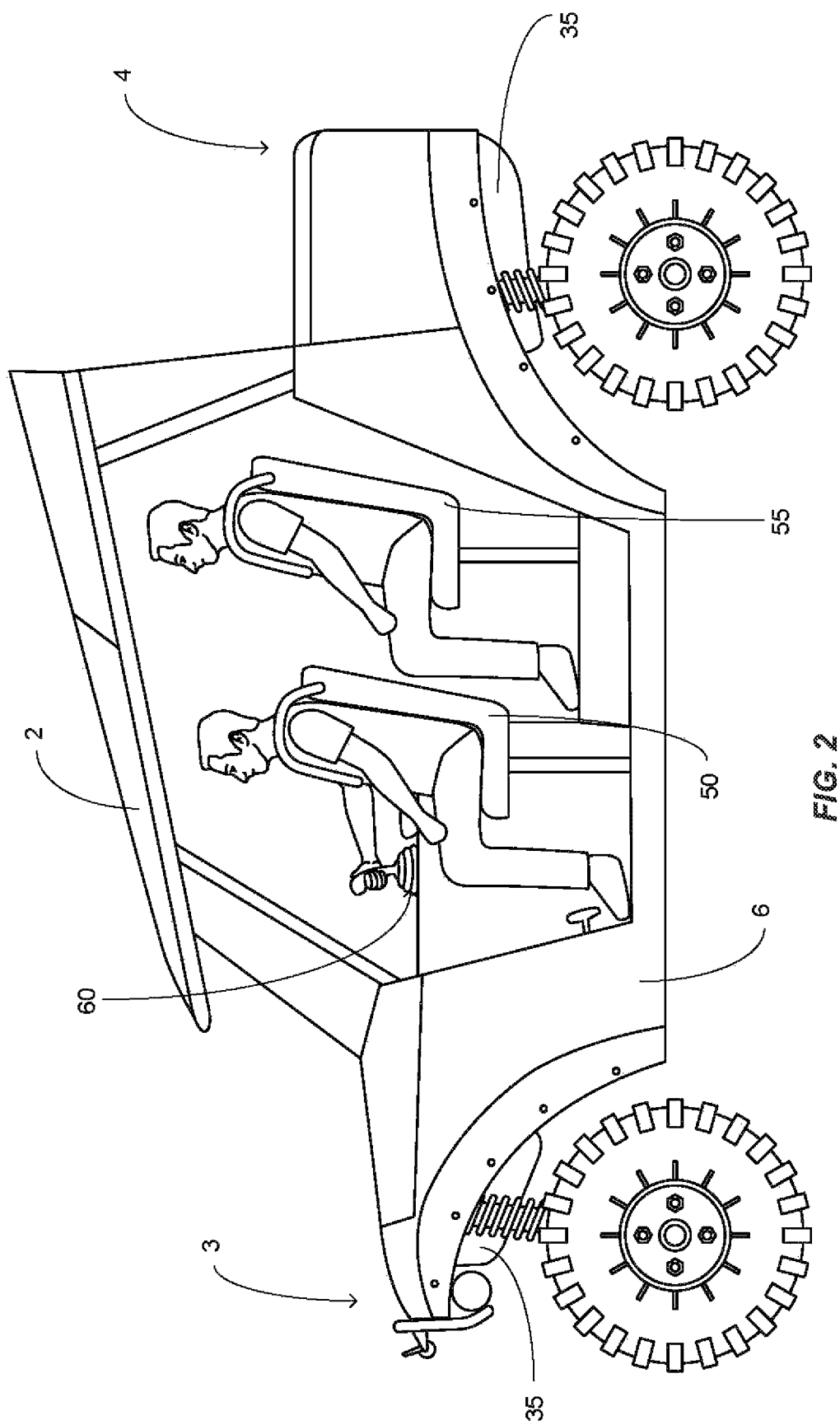
FIG. 2 is a side view of the present invention.
Figure 3:
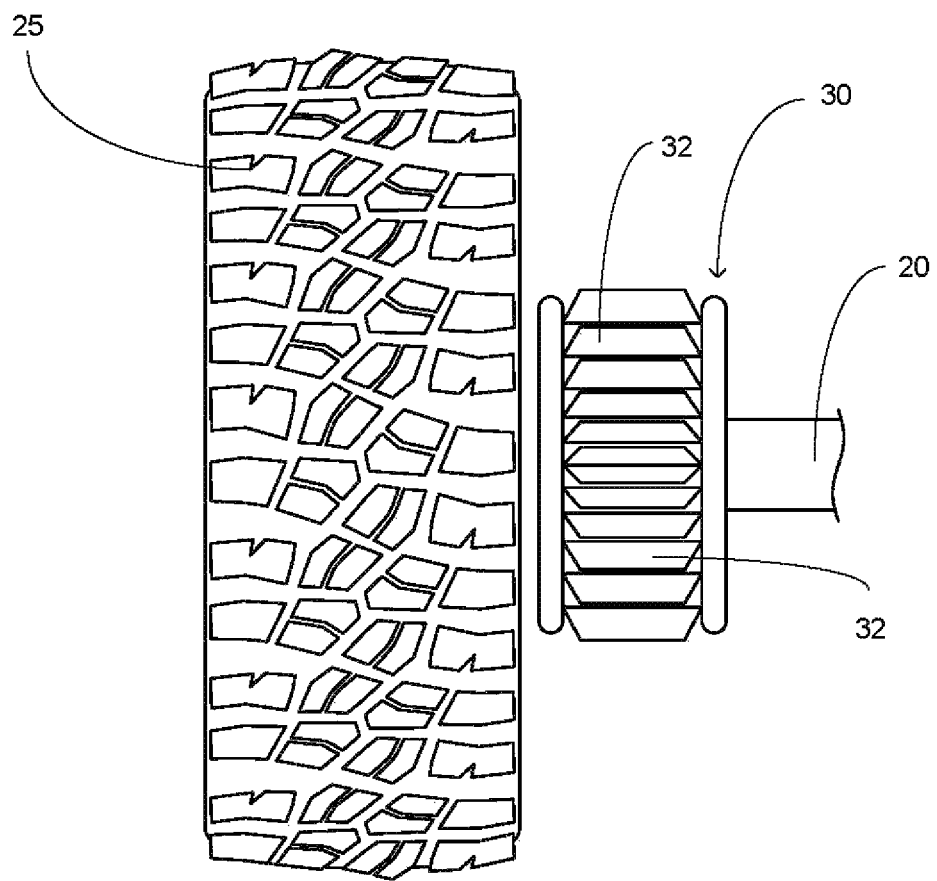
FIG. 3 is a detailed view of the wheel and water propulsion member of the present invention.
Figure 4:
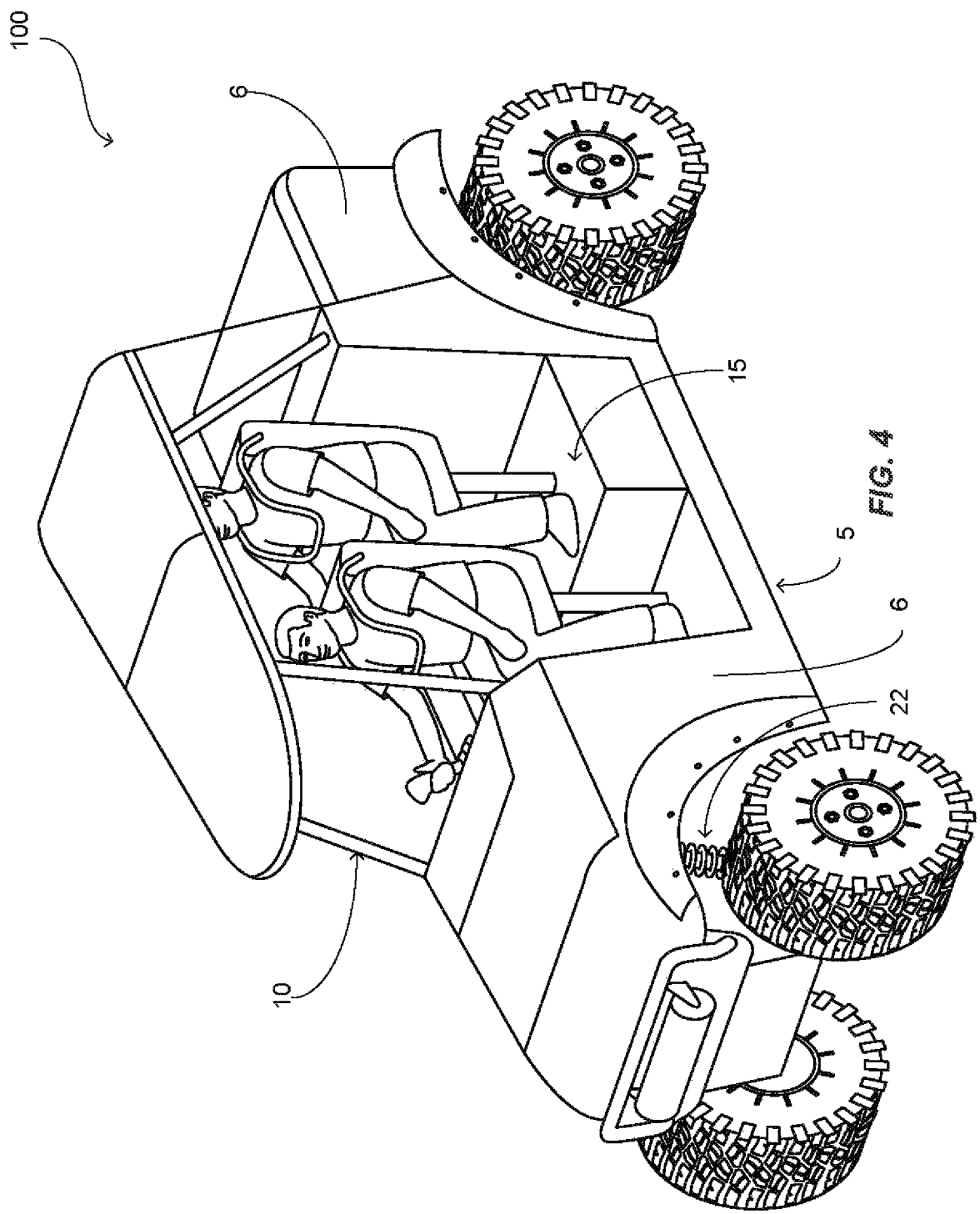
FIG. 4 is a front perspective view of the present invention.

Referring now to the drawings submitted herewith, wherein various elements depicted therein are not necessarily drawn to scale and wherein through the views and figures like elements are referenced with identical reference numerals, there is illustrated an offroad vehicle 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the offroad vehicle 100 should be understood to include a conventional power source such as but not limited to a combustible engine. It should be further understood within the scope of the present invention that the offroad vehicle 100 could be powered by an electric motor in place of and/or in conjunction with a combustible engine. The engine and/or motor of the offroad vehicle 100 could be provided in various horsepower ratings. The offroad vehicle 100 includes a frame 5 having an integrated roll-cage 10 that defines the occupant compartment 15. The frame 5 and roll-cage 10 are manufactured from a suitable rigid material such as but not limited to tubular steel. It should be understood within the scope of the present invention that the frame 5 could be provided in various lengths and widths. Furthermore, it should be understood within the scope of the present invention that the frame 5 could have various styles of body panels 6 and further include door panels along the sides of the occupant compartment 15.

Operably coupled to the frame 5 (and power source not particularly illustrated herein) via axle members 20 and suspension members 22 are wheels 25. The wheels 25 are conventional offroad rubber wheels and it should be understood within the scope of the present invention that the wheels 25 could be provided in various alternate styles and sizes. The wheels 25 are rotatably driven by axle members 20 wherein the axle members 20 are operably coupled to the power source of the offroad vehicle 100 providing rotation thereof. It should be understood within the scope of the present invention that the offroad vehicle 100 is four wheel drive and as such all four wheels 25 are operably coupled to the power source of the offroad vehicle 100. The suspension members 22 are operably coupled to each wheel 25 of the offroad vehicle 100 and are manufactured from suitable components such as but not limited to coil-over shocks. Each suspension member 22 proximate each wheel 25 is independent of the other suspension members 22.

Operably coupled to each axle member 20 is the water propulsion member 30. The water propulsion member 30 is adjacent each wheel 25 and is configured to be moved rotatably by the axle member 20. The water propulsion member 30 is annular in shape having a plurality of blade members 32 wherein the blade members 32 have a void therebetween. The blade members 32 project outward from the center of the water propulsion member 30 and are operable to engage the water surrounding the water propulsion member 30 during the rotation thereof. As the water propulsion member 30 rotates, the blade members 32 provide resistance through the water that propels the offroad vehicle 100 either in a forward or rearward direction. The water propulsion members 30 provide a technique to propel the offroad vehicle 100 through water upon a condition wherein the offroad vehicle 100 is located in sufficiently deep enough water that the wheels 25 no longer engage the ground and as such cannot propel the offroad vehicle 100. It is contemplated within the scope of the present invention that the water propulsion members 30 could be constructed in alternate manners and still provide the desired objective discussed herein. Additionally, while the preferred embodiment of the offroad vehicle 100 includes four water propulsion members 30, it should be understood within the scope of the present invention that the offroad vehicle 100 could employ less than four water propulsion members 30.

The offroad vehicle 100 further includes floatation chambers 35. The floatation chambers 35 are located at the front end 3 and rear end 4 of the frame 5. The floatation chambers 35 in a preferred embodiment of the present invention extend across to width of the frame 5 and are manufactured having an outer wall of impact resistant material and a Styrofoam core or other material that provides buoyancy and floating capabilities for the offroad vehicle 100. The floatation chambers 35 function to float the offroad vehicle 100 in deep water such as but not limited to a deep water filled hole on a trail wherein the floatation chambers 35 provided sufficient buoyancy that the offroad vehicle 100 remain above the water at a height to inhibit water from entering the occupant compartment 15. While floatation chambers 35 are illustrated herein at the front end 3 and rear end 4, it is contemplated within the scope of the present invention that the offroad vehicle 100 could include additional floatation chambers 35 in alternate locations on the frame 5. Furthermore, it should be understood within the scope of the present invention that the floatation chambers 35 could be constructed with alternate elements and/or materials in order to provide the desired functionality described herein.

The offroad vehicle 100 includes an occupant compartment 15 that has a first seat member 50 and second seat member 55 that are axially aligned from the front end 3 to rear end 4. The axial alignment of the first seat member 50 and second seat member 55 provides an ability to reduce the overall width of the offroad vehicle 100 thus providing improved trail access on narrower trails and other similar areas. The second seat member 55 is elevated with respect to the first seat member 50. An elevated position of the second seat member 55 provides an ability for an occupant disposed in the second seat member 55 to see forward of the offroad vehicle 100 during operation thereof. It should be understood within the scope of the present invention that the second seat member 55 could be elevated with respect to the first seat member 50 at various alternate heights.

The occupant compartment 15 includes controller 60 located proximate the first seat member 50 and is configured to provide an interface for an occupant disposed in the first seat member 50 to operate the offroad vehicle 100. The controller 60 in a preferred embodiment is a joystick style controller wherein the movements thereof correspond to movements of the offroad vehicle 100. By way of example but not limitation, a forward movement of the controller 60 results in a forward movement of the offroad vehicle 100. Additionally, a left or right movement of the controller 60 results in a left or right turn respectively of the offroad vehicle 100. In a preferred embodiment of the present invention, the rear wheels are operably coupled to the controller 60 and as such turn upon movement of the controller 60 to the left or right. The rear wheels will move only a portion of the movement of the front wheels. By way of example but not limitation, the rear wheels will move twenty percent of the turn angle of the front wheels for a movement of the controller 60 to the left or right. For example, if the controller 60 is moved to the left to facilitate a turn of the front wheels of forty degrees, the rear wheels will move eight degrees simultaneously in the same direction.

It is contemplated within the scope of the present invention that the offroad vehicle 100 includes conventional elements such as but not limited to graphic display panel, audio equipment, wireless communication protocols for communicably coupling to a smart phone and an on-board communication system such as but not limited to wired or wireless headsets for the individuals disposed within the occupant compartment 15. It should be understood within the scope of the present invention that the offroad vehicle 100 is provided in a plurality of colors and/or graphic styles. It is further contemplated within the scope of the present invention that control interfaces such as but not limited to switches or button are placed on the interior surface of the roof 2.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An offroad vehicle configured to travel across diverse terrains wherein the offroad vehicle comprises:
   a frame, said frame having a front end and a rear end, said frame defining an occupant compartment, said frame being integrally formed with a roll cage, said roll cage extending upward from said frame, said occupant compartment having a front seat member and a rear seat member, said front seat member and said rear seat member being axially aligned between said front end and said second end of said frame, the front seat member and the rear seat member being separate seat members and spaced apart to produce a void dimensioned to provide space for legs of a occupant of the rear seat member;
   four wheels, said four wheels being operably coupled to said frame with axle members, said axle members configured to rotate said four wheel members, wherein at least two of said axle members further including water propulsion members, said water propulsion members being mounted to said axle members adjacent said wheels, said water propulsion members configured to propel the offroad vehicle through water;
   a controller, said controller being adjacent said front seat member, said controller configured to provide operation of the offroad vehicle, wherein movements thereof result in a corresponding movement of the offroad vehicle.

2. The offroad vehicle configured to travel across diverse terrains as recited in claim 1, and further including a first floatation member, said first flotation chamber being mounted proximate said front end of said frame between the wheels coupled proximate to said front end of said frame, said first floatation chamber configured to provide floatation for the offroad vehicle.

3. The offroad vehicle configured to travel across diverse terrains as recited in claim 2, and further including a second floatation member, said second flotation chamber being mounted proximate said rear end of said frame between the wheels coupled proximate to said rear end of said frame, said second floatation chamber configured to provide floatation for the offroad vehicle.

4. The offroad vehicle configured to travel across diverse terrains as recited in claim 3, wherein said rear seat member is at a height that is greater than a height of the front seat member.

5. The offroad vehicle configured to travel across diverse terrains as recited in claim 4, wherein said water propulsion members include a plurality of blades, said blades extending outward from the water propulsion members, said plurality of blades having voids therebetween.

6. The offroad vehicle configured to travel across diverse terrains as recited in claim 5, wherein said first floatation member and said second floatation member include a foam material disposed therein.

7. The offroad vehicle configured to travel across diverse terrains as recited in claim 6, and further including a roof member, said roof member being mounted to a top of the roll cage.

8. The offroad vehicle configured to travel across diverse terrains as recited in claim 7, wherein said four wheels includes two front wheels and two rear wheels, said two front wheels and said two rear wheels being operably coupled to said controller, wherein said two rear wheels turn at an angle approximately twenty percent of an angle of the two front wheels in response to said controller.

9. The The offroad vehicle configured to travel across diverse terrains as recited in claim 1, wherein said controller is a joystick.

* * * * *